United States Patent
Ern

[15] 3,641,818
[45] Feb. 15, 1972

[54] APPARATUS FOR MEASURING LIMITED FLOW CAPACITIES

[72] Inventor: Klaus-Jurgen Ern, Langenfeldt-Richrath, Germany

[73] Assignee: Zellweger Ltd., Uster, Switzerland

[22] Filed: Mar. 19, 1970

[21] Appl. No.: 21,030

[30] Foreign Application Priority Data

July 29, 1969 Switzerland..................111528/69

[52] U.S. Cl. ............................................................73/226
[51] Int. Cl. ...........................................................G01f 1/00
[58] Field of Search..........................................73/226, 223

[56] References Cited

UNITED STATES PATENTS

| | | | |
|---|---|---|---|
| 2,884,942 | 5/1959 | Caldwell et al. | 73/226 X |
| 2,505,905 | 5/1950 | McAfee | 73/223 |
| 3,000,207 | 9/1961 | Goffe | 73/223 X |

FOREIGN PATENTS OR APPLICATIONS 1,160,472  8/1969  Great Britain..........................73/226

*Primary Examiner*—Jerry W. Myracle
*Attorney*—Craig, Antonelli & Hill

[57] ABSTRACT

The present disclosure is directed to an apparatus for measuring limited flow capacities, particularly for monitoring continuous-cycle automatic dispensing and analyzing devices. The apparatus comprises a measuring chamber adapted to be charged with a liquid to be measured, inlet means for introducing a quantity of liquid into the lower portion of the measuring chamber, a siphon tube communicating with the measuring chamber at substantially the same level as the inlet means, a first and second level sensor device disposed in the lower portion and upper portion of the measuring chamber respectively, said level sensor devices generating electrical signals when a predetermined level is passed and at least one clock means associated with the sensor devices for determining at least one filling time.

12 Claims, 2 Drawing Figures

PATENTED FEB 15 1972 3,641,818

APPARATUS FOR MEASURING LIMITED FLOW CAPACITIES

BACKGROUND OF THE INVENTION

The present invention is directed to an apparatus for measuring limited flow capacities, particularly for monitoring continuous-cycle automatic dispensing and analyzing devices.

If continuous-cycle automatic dispensing and analyzing devices are to function properly, the exact quantities of liquid being handled must be known. It is also desirable to monitor the dispensing and delivery elements for correct operation so that any faults occurring can be detected and eliminated.

Depending upon the particular problem to be solved, only limited flow capacities have to be monitored so that not all the conventional volumeters are suitable. There are many methods of measuring flow capacities for example, volumetric processes, restricted-flow processes, float-regulated processes and processes using inductive primary elements. Suitable for limited flow capacities, are drum counters (up to 3 liters/hour), and suspended-particle meters (up to 0.5 liters/hour). Only the drum counter has the additional property of giving measurements independent of the density of the liquid.

It will be seen that these known processes are not universally applicable and, depending upon the particular problem to be solved, have specific advantages and disadvantages.

SUMMARY OF THE INVENTION

An object of the present invention is to overcome the prior art disadvantages in measuring limited flow capacities, particularly for monitoring continuous-cycle automatic dispensing and analyzing devices.

Another object of the present invention is to provide an improved apparatus for measuring limited flow capacities which are independent of the density of the liquid.

Other objects and further scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

Pursuant to the present invention it has been found that the above-mentioned disadvantages may be eliminated and a much improved apparatus for measuring limited flow capacities can be provided which comprises a measuring chamber adapted to be charged with liquid to be measured, a siphon tube opening into the measuring chamber, level sensors for generating electrical signals when a desired liquid level is passed, and at least one clock for determining at least one filling time.

BRIEF DESCRIPTION OF THE DRAWINGS

The present invention will become more fully understood from the detailed description given hereinbelow and the accompanying drawings which are given by way of illustration only and thus are not limitative of the present invention and wherein, FIG. 1 diagrammatically illustrates the apparatus according to the present invention.

DESCRIPTION OF THE PREFERRED EMBODIMENTS

Figure 1:
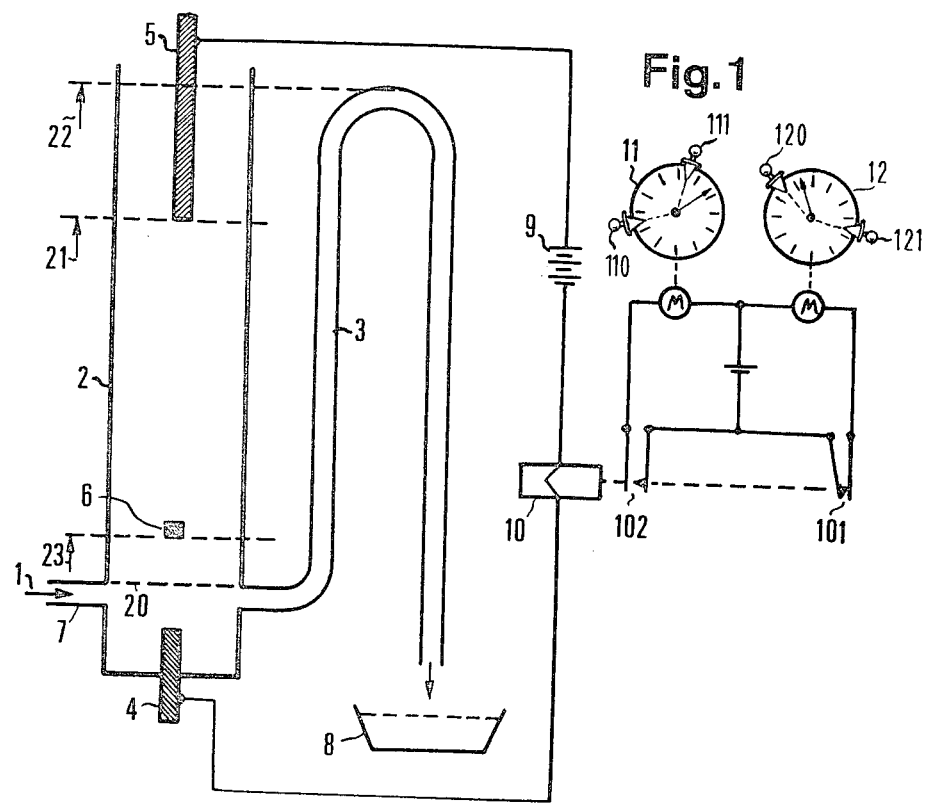

Referring now to the apparatus of the present invention and particularly to FIG. 1, a measuring cylinder 2 is connected to a pipe 7 carrying a quantity of liquid 1 to be measured. A siphon pipe 3, which initially extends upwards along the measuring cylinder 2 for a distance before reversing its direction, is open at the same level as the pipe 7. The open end of the downwardly extending portion of the siphon pipe 3 is beneath the level of the inlet pipe 7 and discharges the liquid flowing through the pipe 3 into a collecting vessel 8.

A first electrode 4 is mounted in the bottom of the measuring cylinder 2. A second electrode 5 projects out of the top of the measuring cylinder. The lower part of the electrode 5 extends beneath the curve or bend in the siphon pipe 3. The electrodes 4 and 5 act as level sensors and are connected to an electric circuit containing a voltage source 9 and a relay 10.

As long as the column of liquid in the measuring cylinder 2 does not reach the electrode 5, the electric circuit is broken and the relay 10 remains in a position of rest. When the column of liquid reaches the electrode 5, current flows through the liquid, which is assumed to be electrically conductive, thereby activating the relay 10. The relay 10 has, for example, one break contact 101 and one make contact 102. Clocks 11, 12, are supplied with voltage through these contacts. The clock 11 is connected to the make contact 102 and works only when the relay 10 is activated. The clock 12 is connected to the break contact 101 and is stopped while the relay 10 is activated. These clocks are provided with devices 110, 111 and 120, 121 for setting advance times with which ideal times can be set. If the running time of one of the clocks exceeds this set ideal time from a given starting point, an appropriate contact device generates a signal indicating deviation of the time interval provided for completion of the operation.

In the present situation the volume measurement takes place as follows:

The quantity of liquid 1 to be measured charges the measuring cylinder from an initial level 20. When the column of liquid reaches the level 21, the zone between the electrodes 4 and 5 becomes conductive, the relay 10 is activated and the clock 11 which has been wound back to zero beforehand begins to measure the time. The measuring cylinder continues to be charged until the upper bend in the siphon tube 3 communicating with it has been reached, after which the measuring cylinder is automatically emptied by the siphon pipe 3.

As a result, the liquid level falls from point 22 because the quantity removed per unit of time is greater than the quantity being supplied. When the level falls below point 21, the circuit for the relay 10 is broken and the clock 11 stops. In its place, the clock 12 is started, having hitherto remained in its starting position. The liquid level continues to fall until it reaches the level 20 of the socket for the siphon pipe 3, which signifies that the emptying procedure is over and that the measuring cylinder 2 can again be filled. When level 21 is again reached, the relay 10 is reactivated which stops clock 12 and starts clock 11 again. Thus, throughout the entire charging and emptying cycle one of the clocks 11 or 12 is working and the point of time at which one clock stops and the other clock starts can be used as the criteria for the correct filling time. As already mentioned, comparison with a predeterminable ideal time is initiated to this end.

If the filling time differs from this ideal time, and particularly if it is longer, this means that either the feed capacity is too small or there is a leak in the pipe through which some of the liquid being delivered is escaping. The signal thus released indicates that the installation should be inspected.

If the filling and emptying cycles are to be determined with a high degree of accuracy, it is advantageous to provide an electrode 6 in the measuring cylinder above the inflow level 20 in place of the lower electrode 4. The lower liquid level 20 where emptying of the measuring cylinder stops and filling begins, is not precisely defined because it is governed by the diameter of the inlet delivery pipe 7 and siphon pipe 3. However, the electrode 6 produces a defined level 23 at which the relay circuit is made or broken.

Figure 2:
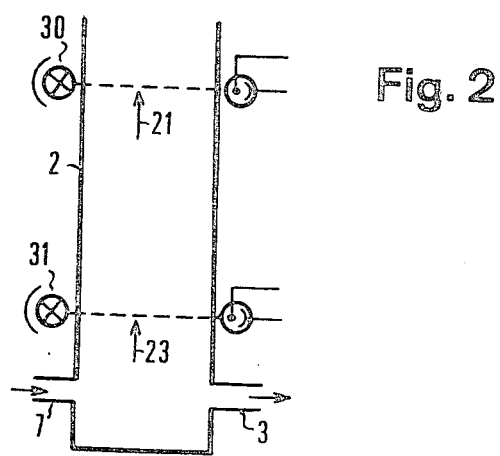
FIG. 2 illustrates another embodiment of the present invention.

It would also be quite possible to use contact-free level sensors instead of the electrodes 4, 5 and 6, 5 dipping into the liquid. An example of this is shown in FIG. 2.

Photoelectric devices 30 and 31 are used instead of the electrodes. When the liquid level passes these devices they initiate the switching functions necessary for actuating the relay 10.

Since in this apparatus volume measurement is converted into a time measurement, a high degree of accuracy is obtained. If, for example, one measurement is made per minute, errors can be reduced to less than ±0.5 percent. If several measurements are collected over prolonged periods, the possibility of error is even further reduced.

The apparatus according to the present invention is of particular advantage in cases where small quantities (0.5 liter/hour) have to be measured. In addition, the measurements are not governed by the density of the liquid.

The invention being thus described, it will be obvious that the same may be varied in many ways. Such variations are not to be regarded as a departure from the spirit and scope of the invention, and all such modifications as would be apparent to one skilled in the art are intended to be included.

What is claimed is:

1. An apparatus for measuring limited flow capacities which comprises a measuring chamber adapted to be charged with a liquid to be measured, inlet means for introducing a quantity of liquid into the lower portion of the measuring chamber, a siphon tube communicating with the measuring chamber at substantially the same level as the inlet means, a first and a second level sensor device disposed in the lower portion and upper portion of the measuring chamber respectively, said level sensor devices generating electrical signals when a predetermined level is passed and first and second clock means connected to the sensor devices for determining a first and a second filling time, said first and second level sensor devices forming part of electric circuit means for controlling said first and second clock means, said electric circuit means including first means for actuating said first clock means as long as the liquid level is in the range of said second level sensor device and at the desired level and second means for actuating said second clock means when the liquid level falls below said desired level.

2. The apparatus of claim 1, wherein the first and second level sensor devices are first and second electrodes disposed in the measuring chamber.

3. The apparatus of claim 2, wherein the second electrode is arranged at the desired level to be measured.

4. The apparatus of claim 2, wherein the first electrode is arranged in the lower portion of the measuring cylinder below the point where the siphon tube communicates with said cylinder.

5. The apparatus of claim 2 wherein the first electrode is arranged in the lower portion of the measuring cylinder above the point where the siphon tube communicates with said cylinder.

6. The apparatus of claim 2, wherein the siphon tube extends upwards along the measuring cylinder from the bottom portion to the top portion thereof and then reverses its direction extending downward until it terminates below the level of the inlet means.

7. The apparatus of claim 6, wherein the second electrode is effective in a level range determined by the reversing bend portion of the siphon tube.

8. The apparatus of claim 6, wherein the lower portion of the second electrode extends beneath the reversing portion of the siphon tube and the upper portion extends out of the measuring cylinder.

9. The apparatus of claim 1, wherein the level sensors are photoelectric devices.

10. The apparatus of claim 1, wherein said first and second clock means are provided with setting means for ideal times and signal means which respond to deviations of the measuring time from the ideal time.

11. The apparatus of claim 1, wherein the discharge end of the siphon tube communicates with a collecting vessel.

12. The apparatus of claim 1, wherein the level sensors are connected to an electrical circuit containing a voltage source and a relay device.

* * * * *